US009356951B2

(12) United States Patent
Beiter

(10) Patent No.: US 9,356,951 B2
(45) Date of Patent: May 31, 2016

(54) RESPONSES TO SERVER CHALLENGES INCLUDED IN A HYPERTEXT TRANSFER PROTOCOL HEADER

(75) Inventor: Mike Beiter, Boblingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 366 days.

(21) Appl. No.: 13/704,026

(22) PCT Filed: Jul. 9, 2010

(86) PCT No.: PCT/US2010/041606
§ 371 (c)(1),
(2), (4) Date: Dec. 13, 2012

(87) PCT Pub. No.: WO2012/005739
PCT Pub. Date: Jan. 12, 2012

(65) Prior Publication Data
US 2013/0086679 A1    Apr. 4, 2013

(51) Int. Cl.
*G06F 12/14* (2006.01)
*H04L 29/06* (2006.01)
(52) U.S. Cl.
CPC ............ *H04L 63/1441* (2013.01); *H04L 63/08* (2013.01); *H04L 63/1466* (2013.01)
(58) Field of Classification Search
CPC .. H04L 63/1441; H04L 63/08; H04L 63/1466
USPC .......... 709/203; 726/3, 6, 7, 22; 713/168, 176
See application file for complete search history.

(56) References Cited

U.S. PATENT DOCUMENTS

| 5,740,361 | A  | * | 4/1998 | Brown | ..................... | G06F 21/31 |
| | | | | | | 726/5 |
| 2002/0002688 | A1 | * | 1/2002 | Gregg | ..................... | G06F 21/10 |
| | | | | | | 726/3 |
| 2003/0046589 | A1 | * | 3/2003 | Gregg | ................... | G06F 21/335 |
| | | | | | | 726/5 |
| 2003/0074580 | A1 | * | 4/2003 | Knouse | ............... | H04L 63/0815 |
| | | | | | | 726/4 |
| 2005/0014489 | A1 | * | 1/2005 | Zhigang | .............. | H04M 3/4938 |
| | | | | | | 455/414.2 |
| 2005/0289360 | A1 | | 12/2005 | Banginwar et al. | | |
| 2006/0005020 | A1 | * | 1/2006 | Hardt | .................. | H04L 63/1416 |
| | | | | | | 713/166 |

(Continued)

FOREIGN PATENT DOCUMENTS

KR    10-2010-0071115    6/2010

OTHER PUBLICATIONS

"HTTP Authentication Schemes".

(Continued)

*Primary Examiner* — Thu Ha Nguyen
(74) *Attorney, Agent, or Firm* — Hewlett Packard Enterprise Patent Department

(57) ABSTRACT

Example embodiments relate to verification of client requests based on a response to a challenge (135; 235) included in an HTTP Header. In some embodiments, a server computing device (100; 300; 350) may generate a challenge (130; 230) in response to receipt of a request from a client (200; 330; 380) and may include a random nonce with the challenge. In some embodiments, the server computing device (100; 300; 350) may then verify that a second request includes, in an HTTP header, a response to the challenge (135; 235) that corresponds to the random nonce. Additional example embodiments relate to transmission of a response to a challenge from a client computing device (200; 330; 380) to the server (100; 300; 350).

15 Claims, 4 Drawing Sheets

(56) References Cited

U.S. PATENT DOCUMENTS

| | | |
|---|---|---|
| 2006/0013570 A1 | 1/2006 | Suzuki |
| 2006/0031338 A1 | 2/2006 | Kang et al. |
| 2006/0182280 A1* | 8/2006 | Laitinen .................. H04L 63/06 380/247 |
| 2006/0212511 A1* | 9/2006 | Garcia-Martin .............. 709/203 |
| 2007/0250711 A1* | 10/2007 | Storey ..................... H04W 4/18 713/168 |
| 2008/0232392 A1* | 9/2008 | Liang .................... H04L 65/105 370/450 |
| 2008/0320567 A1 | 12/2008 | Shulman et al. |
| 2009/0094372 A1 | 4/2009 | Nyang et al. |
| 2009/0249489 A1 | 10/2009 | Livshits et al. |
| 2010/0050005 A1 | 2/2010 | Fujiwara |
| 2010/0100927 A1 | 4/2010 | Bhola et al. |
| 2010/0122320 A1 | 5/2010 | Merati et al. |
| 2010/0141777 A1 | 6/2010 | Jin et al. |
| 2010/0293385 A1* | 11/2010 | Nanda ................... H04L 63/166 713/176 |
| 2011/0004924 A1* | 1/2011 | Farrell ................... H04L 9/3271 726/4 |
| 2011/0219427 A1* | 9/2011 | Hito ........................ G06F 21/00 726/3 |
| 2011/0258432 A1* | 10/2011 | Rao ......................... H04L 63/08 713/150 |
| 2012/0090030 A1* | 4/2012 | Rapaport ............ H04L 63/1441 726/23 |
| 2012/0323717 A1* | 12/2012 | Kirsch ............... G06Q 20/0855 705/26.1 |
| 2013/0080769 A1* | 3/2013 | Cha et al. ....................... 713/155 |
| 2014/0096194 A1* | 4/2014 | Bhogavilli et al. ................ 726/3 |
| 2014/0189828 A1* | 7/2014 | Baghdasaryan et al. .......... 726/6 |
| 2014/0283038 A1* | 9/2014 | Call .................... H04L 63/1441 726/22 |
| 2014/0289833 A1* | 9/2014 | Briceno et al. ..................... 726/7 |
| 2015/0312255 A1* | 10/2015 | Libonate ............. H04L 63/0876 713/168 |

OTHER PUBLICATIONS

Grossman;"Cross-Site Request Forgery: The Sleeping Giant."; Copyright 2009, WhiteHat Security, Inc.

Tsai, Jia Lun; Efficient Nonce-based Authentication Scheme for Session Initiation Protocol.; Jul. 2009; vol. 9, No. 1, pp. 12-16. International Journal of Network Security.

WIPO, International Search Report dated Apr. 28, 2011, PCT/US2010/041606 filed Jul. 9, 2010.

* cited by examiner

RESPONSES TO SERVER CHALLENGES INCLUDED IN A HYPERTEXT TRANSFER PROTOCOL HEADER

BACKGROUND

In one class of web-based attacks, a malicious user exploits the trust that is established between a victim and another entity to trigger execution of malicious requests. One such attack is the Cross-Site Request Forgery (CSRF) attack, in which a malicious user relies on the trust established between a victim and a website with which the victim has established an authenticated session.

More specifically, in a typical CSRF attack, the malicious user includes a link or script in a page that performs a function on the website with which the victim has established the authenticated session. The malicious user could include this link or script in, for example, a post to a message board or an email to the victim. Upon receipt of the page from the malicious user, the victim's web browser transmits the request to the website's server and, per standard browser operation, automatically provides the user's authentication credentials with the request. Because the remote site receives the proper credentials along with the request, it assumes that the victim submitted the request and therefore executes the requested function.

In this manner, the malicious user inherits the identity and privileges of the victim to perform undesired functions on the victim's behalf without the victim's knowledge. For example, the malicious user can trick the user into changing account information, transferring funds, purchasing an item, or performing any other function provided by the vulnerable website. CSRF attacks can therefore be very damaging to both the victim and the website that unwittingly executed the malicious request, as the attacker may perform any function provided to the victim by the vulnerable website.

BRIEF DESCRIPTION OF THE DRAWINGS

The following detailed description references the drawings, wherein.

DETAILED DESCRIPTION

As detailed above, CSRF attacks can be very damaging to both the victim and the website that unwittingly executed the malicious request. To address this issue while minimally impacting performance of the client and server and minimizing the number of changes in the routines executed by each system, example embodiments disclosed herein provide for verification of requests using a response to a challenge included in a Hypertext Transfer Protocol (HTTP) header.

In particular, in some embodiments, a server computing device may generate a challenge in response to receipt of a first client request from a client. This challenge may include a randomly-generated nonce, After generation of the challenge, the server may transmit the challenge to the client in response to the first request and may subsequently receive a second request from the client. Upon receipt of the second request, the server may verify, based on examination of data included in a Hypertext Transfer Protocol (HTTP) header, that the second request includes a response to the challenge that corresponds to the random nonce, A client computing device may be similarly configured to receive a challenge from the server computing device and, in response, generate a request that includes a response to the challenge used to prove that the request from the client is legitimate.

In this manner, the client computing device and server computing device ensure that each request provided from the client to the server is properly authenticated. Therefore, because a CSRF attack depends on execution of a script or other request without the knowledge of the client, requests generated in a CSRF attack attempt would be denied using this methodology. In addition, because the challenge from the server and the response from the client may each be included in an HTTP header, example embodiments have a minimal impact on performance and minimize the number of changes required in the routines executed by each system. In particular, because the request may be authenticated using information included in the HTTP header, example embodiments authenticate a client request in a manner that avoids or minimizes examination of application-level payloads. Accordingly, the application-level logic in the client and server may be minimally modified and, in some embodiments, need not be fully customized for each type of payload (e.g., GET, POST, AJAX, etc.). Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
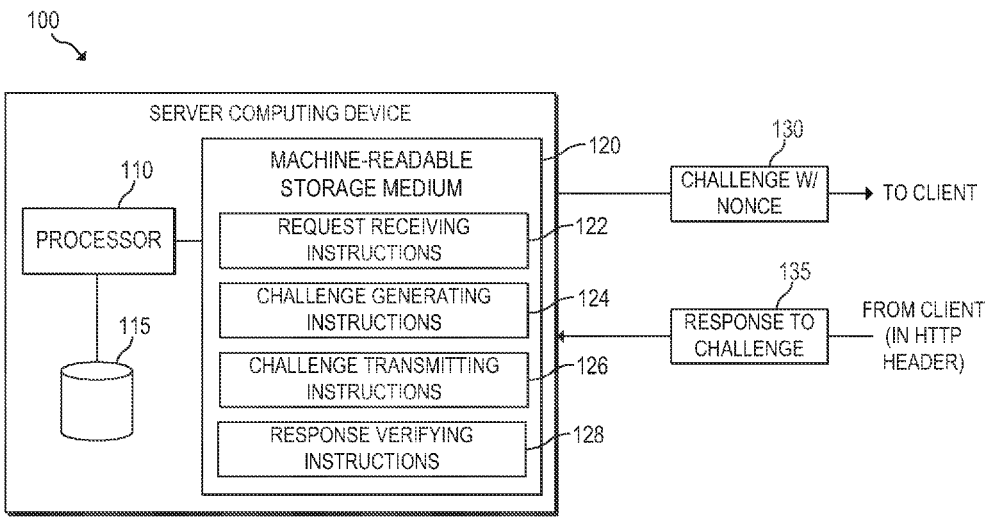
FIG. 1 is a block diagram of an example server computing device for verifying requests from a client using a response to a challenge received in an HTTP header.

Referring now to the drawings, FIG. 1 is a block diagram of an example server computing device 100 for verifying requests from a client using a response to a challenge 135 received in an HTTP header. Server computing device 100 may be, for example, a web server, a Local Area Network (LAN) server, a workstation, a desktop computer, or any other computing device suitable for execution of instructions 122, 124, 126, 128. In the embodiment of FIG. 1, server computing device 100 includes a processor 110, a storage device 115, and a machine-readable storage medium 120.

Processor 110 may be one or more central processing units (CPUs), semiconductor-based microprocessors, or other hardware devices suitable for retrieval and execution of instructions stored in machine-readable storage medium 120. In particular, processor 110 may fetch, decode, and execute instructions 122, 124, 126, 128 to implement the functionality described in detail below. Alternatively, processor 110 may be one or more integrated circuits (Cs) or other electronic circuits that perform the functionality of instructions 122, 124, 126, 128.

Storage device 115 may comprise a number of physical media for storing data under the direction of processor 110. For example, storage device 115 may include one or more hard disks, solid state drives, tape drives, nanodrives, holographic storage devices, or any combination of such storage devices. Although illustrated as included in server computing device 100, in some embodiments, storage device 115 may be included in another device, provided that the data included in storage device 115 is accessible to server computing device 100.

In operation, storage device 115 may store a challenge generated for a particular client in association with a session identifier. The session identifier may be a unique identifier (e.g., an alphanumeric value) generated for each session between a particular client and server computing device 100. By including the session identifier with each request or response, the client and server computing device 100 may identify each communication as associated with a particular session. In addition, by accessing storage device 115 using the session identifier when authenticating a request from a client using the procedure described below, server computing device 100 may retrieve the appropriate challenge 130 from storage device 115.

Machine-readable storage medium 120 may be encoded with executable instructions for verifying requests from a client computing device to prevent CSRF attacks. in order to prevent CSRF attacks, machine-readable storage medium 120 may include a series of instructions that ensure that only the client could have generated a proper response to a challenge 130. More specifically, as described in detail below, machine-readable storage medium 120 may include instructions for receiving a first request from a client, generating and transmitting a challenge 130 to the client, and verifying subsequent requests from the client based on a response to the challenge 135.

Machine-readable storage medium 120 may include request receiving instructions 122, which may receive a first request from a client. This request may be, for example, a request from a web browser or other application running in a client and may be constructed in compliance with the Hypertext Transfer Protocol (HTTP). The request may be, for example, a GET request that requests retrieval of a particular resource accessible to server computing device 100. As an alternative, the request may be a POST request that submits data for processing by server computing device 100, Other suitable formats and contents of the request from the client will be apparent to those of skill in the art (e.g., PUT or DELETE operations).

Request receiving instructions 122 may also receive subsequent requests from the client after establishment of a session with the client. As described in detail below in connection with response verifying instructions 128, these subsequent requests may include a response to a challenge 135 for use in authenticating the request to prevent CSRF attacks. In such instances, request receiving instructions 122 may extract a response to the challenge 135 from the HTTP header, if included, and provide this response 135 to response verifying instructions 128, described in detail below, After receipt of a first request from the client, challenge generating instructions 124 may generate a challenge 130 for transmission to the client with the response to the client request. This challenge 130 may include a random nonce, which may be, for example, a random integer, a random string of alphanumeric characters, or any other random value. As described in detail below in connection with response verifying instructions 128, a client's response 135 to the challenge 130 and the included nonce may be used to verify that the request originated from a legitimate user and not from a malicious user attempting to perform a CSRF attack.

It should be noted that, in some embodiments, challenge generating instructions 124 are executed in response to each request from a client. In this manner, challenge generating instructions 124 may generate a challenge 130 including a new random nonce for each additional request. In such embodiments, a request from a client will be validated if it includes a valid response to the last-generated challenge 130.

Upon generation of a challenge 130 including a random nonce, challenge transmitting instructions 126 may appropriately modify an outgoing response to the client to include the challenge 130. For example, challenge transmitting instructions 126 may include the challenge 130 in an HTTP header of the response sent to the client. Because the challenge 130 may be encoded in the header, rather than the body of the response, the same set of transmitting instructions 126 may be used for each response, thereby minimizing the need for customized application-level logic for each payload type.

As one example, transmitting instructions 126 may include the challenge 130 inside of an HTTP cookie in the HTTP header of the response. Alternatively, transmitting instructions 126 may include the challenge 130 in a custom HTTP header field in the HTTP header (e.g., in a header named "extension-csrf-challenge"). It should be apparent, however, that any HTTP cookie or other HTTP header field may be used for transmission of the challenge 130, provided that the client is configured to read the challenge 130 from this location. After inserting the challenge 130 into the response to be sent to the client, challenge transmitting instructions 126 may transmit the response to the client.

It should be noted that, as with challenge generating instructions 124, challenge transmitting instructions 126 may also be executed in response to each request from a client. In particular, upon generation of a challenge 130 with a new nonce, challenge transmitting instructions 126 may embed this challenge 130 in an HTTP message and transmit the message to the client.

Response verifying instructions 128 may verify, based on examination of data included in an HTTP header of a subsequent request from a client, that the request includes a proper response to the challenge 135. For example, verifying instructions 128 may extract the response to the challenge 135 from the HTTP header of the client's request and verify that the response 135 corresponds to the random nonce included with the challenge 130 previously sent by the server.

Verifying instructions 128 may first read the response to the challenge 135 from a predetermined field in the HTTP header of the second request from the client. This field in the header may be either an HTTP cookie or another HTTP header field. Verifying instructions 128 may then compare a nonce included with the response to an expected value of the response, which may be determined, for example, by querying storage device 115 for the stored value of the originally-generated nonce. Finally, verifying instructions 128 may permit server computing device 100 to respond to the request from the client when response 135 is properly verified or, alternatively, may instruct server computing device 100 to ignore the request when the response 135 does not match the expected value.

The CSRF prevention scheme executed by verifying instructions 128 is based on the premise that only the client may properly frame the response 135, as only the client has access to the nonce included with the challenge 130. In other words, verifying instructions 128 are based on the assumption that, due to existing web browser security mechanisms, the malicious user does not have access to the contents of the challenge 130. For example, a typical browser's "same origin policy" will prevent a malicious user from reading the value of the nonce included in the challenge 130. Accordingly, as detailed below, the specifics of each implementation of verifying instructions 128 depend on the format of the original challenge 130 (i.e., whether it was included in a cookie or another header field) and on the format of the response (Le., whether it is included in the cookie or another header field).

As detailed above in connection with challenge generating and transmitting instructions 124, 126, in some embodiments, the challenge 130 is included in an HTTP cookie. In such embodiments, verifying instructions 128 operate on the premise that the client somehow modifies the representation of the challenge to properly authenticate itself. In particular, in a typical implementation according to the HTTP standard, a client automatically includes a session cookie with each request. Thus, in embodiments in which the challenge 130 is included in an HTTP cookie, to properly authenticate a request, the client either modifies the value of the nonce or modifies the transport representation of the nonce.

In a first implementation in which the challenge 130 is included in an HTTP cookie, response verifying instructions 128 may expect the response to the challenge 135 in the HTTP cookie of the HTTP header. In such embodiments, response verifying instructions 128 may expect that the client has modified the value of the nonce based on application of a transformation function known to both the client and server computing device 100. This transformation function may be, for example, a mathematical function that modifies the value of a nonce provided as an input parameter. For example, the function may increment the nonce by 1, apply a hash function, or otherwise modify the nonce. Accordingly, in determining the expected value of the nonce included with the response 135, verifying instructions 128 may apply the transformation function to the value of the nonce retrieved from storage device 115. Verifying instructions 128 may then compare the expected value to the value included with the response 135 to determine whether the values match.

In a second implementation in which the challenge 130 is included in an HTTP cookie, response verifying instructions 128 may expect the response to the challenge 135 in an HTTP header field other than the original cookie. In such embodiments, the inclusion of the unmodified random nonce in the HTTP header field is sufficient to verify that the request has been properly initiated by the client. Icy particular, this modification of the transport representation of the nonce authenticates the request, as only the client itself has access to the value of the nonce, In other words, due to existing web browser security mechanisms, it would not be possible for a malicious user or third party site to read the nonce and move it from a cookie in the header to another HTTP header field. It should be noted that, in such implementations, the client and server computing device 100 may also apply a transformation function to modify the value of the nonce.

As also detailed above in connection with challenge generating and transmitting instructions 124, 126, in some embodiments, the challenge 130 is included in an HTTP header field that is not a cookie. In typical implementations according to the HTTP standard, header fields other than the cookie are not automatically included in responses from the client. Accordingly, when the challenge 130 is not included in a cookie, the presence of the nonce in the HTTP header of the response 135 is sufficient to confirm the client's identity. Thus, in such embodiments, verifying instructions 128 may be configured to check response to challenge 135 for a nonce with a value identical to the stored nonce in any location in the HTTP header (i.e., either the cookie or another header field). It should be noted, however, that a transformation function that modifies the value of the nonce may also be implemented on both the client and server computing device 100.

Figure 2:
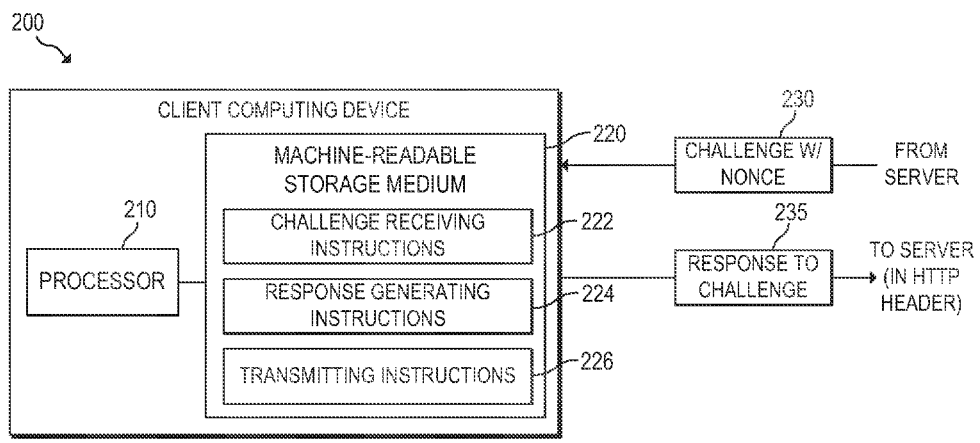
FIG. 2 is a block diagram of an example client computing device for sending requests to a server including a response to a challenge in an HTTP header.

FIG. 2 is a block diagram of an example client computing device 200 for sending requests to a server including a response to a challenge 235 in an HTTP header. Client computing device 200 may be, for example, a desktop computer, a laptop computer, a handheld computing device, a mobile phone, or the like. In the embodiment of FIG. 1, computing device 200 includes a processor 210 and a machine-readable storage medium 220.

Processor 210 may be one or more central processing units (CPUs), semiconductor-based microprocessors, or other hardware devices suitable for retrieval and execution of instructions stored in machine-readable storage medium 220, In particular, processor 210 may fetch, decode, and execute instructions 222, 224, 226 to implement the functionality described in detail below. Alternatively, processor 210 may be one or more integrated circuits (ICs) or other electronic circuits that perform the functionality of instructions 222, 224, 226.

Machine-readable storage medium 220 may be encoded with executable instructions for authenticating requests sent to a server computing device to prevent CSRF attacks. In order to prevent CSRF attacks, machine-readable storage medium 220 may include a series of instructions that ensure that the client can generate a proper response to a challenge 230 received from the server. More specifically, as described in detail below, machine-readable storage medium 220 may include instructions for receiving a challenge 230 from the server, generating a response 235, and transmitting the response 235 to the server.

In particular, machine-readable storage medium 220 may be encoded with challenge receiving instructions 222, which may receive a challenge 230 generated by the server in response to a first request sent to the server. As detailed above, this challenge 230 may include a random nonce generated by the server and, in some embodiments, may be included in an HTTP header of the response from the server (e.g., in a cookie or another HTTP header field). In such embodiments, because the challenge 230 is included in an HTTP header, receiving instructions 222 may extract the random nonce without customized application-level logic that examines the payload of the response.

Response generating instructions 224 may receive the random nonce included in the challenge 230 from receiving instructions 222 and, in response, generate a response to the challenge 235 used to authenticate the request to the server. In particular, response generating instructions 224 may include the nonce in response 235 in a manner that proves that the client has access to the value of the nonce. Again, because the malicious user will not have access to the value of the nonce, such a response is sufficient to preclude the possibility of a CSRF attack.

As with response verifying instructions 128 of server computing device 100, response generating instructions 224 may vary depending on the particular implementation. In particular, generating instructions 224 may vary depending on whether the challenge 230 is included in an HTTP cookie or in an HTTP header field other than a cookie. It should be noted that, regardless of the implementation, inclusion of the response 235 in an HTTP header of the request minimizes the need for modifying application-level logic that accesses the application-level payload.

When challenge 230 is included in an HTTP cookie, server computing device 100 may expect client computing device 200 to modify the representation of the nonce to properly authenticate the next request. Again, this is based on the assumption that the HTTP cookie is automatically included with each communication between the server and client computing device 200. Thus, in such implementations, response generating instructions 224 may apply a transformation function to modify the value of the nonce and include the modified nonce in the HTTP cookie. Alternatively, response generating instructions 224 may include the nonce in an HTTP header field other than the cookie. When included in a header field other than a cookie, the nonce may be unmodified or, alternatively, may be modified using a transformation function.

When challenge 230 is included in an HTTP header field other than a cookie, inclusion of the nonce in a response 235 included with the client's next request is sufficient to authenticate the request. Thus, in such implementations, response generating instructions 224 may include the response 235 in the HTTP cookie or another HTTP header field. The HTTP header field may, depending on the implementation, be the same header used for challenge 230 or, alternatively, may be a header with a different name. In some embodiments, the nonce included with response 235 may also be modified using a transformation function, provided that the server is also configured to apply this transformation function.

Transmitting instructions 226 may be configured to transmit the response to challenge 235 to server along with the next request. In particular, as detailed above, the response to challenge 235 may be included in the HTTP header of the next request transmitted to the server. Again, the response 235 may be included in either an HTTP cookie or another HTTP header field of the HTTP header.

Figure 3A:
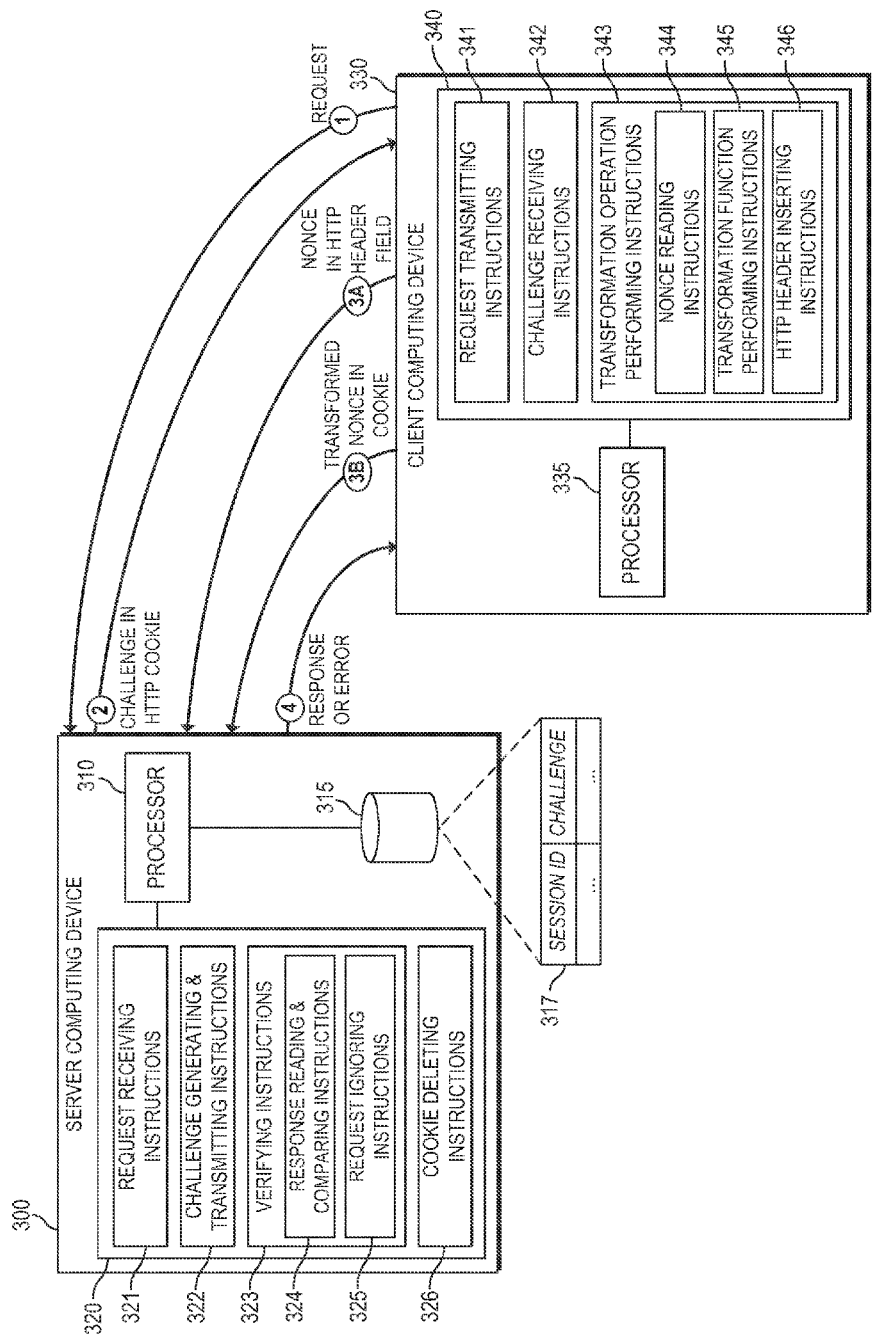
FIG. 3A is a block diagram of an example server computing device in communication with an example client computing device for verifying requests based on transmission of a challenge in an HTTP cookie.

FIG. 3A is a block diagram of an example server computing device 300 in communication with an example client computing device 330 for verifying requests based on transmission of a challenge in an HTTP cookie. As detailed below, server computing device 300 may prevent CSRF attacks by sending a challenge in an HTTP cookie and authenticating requests from client computing device 330 based on a corresponding response to the challenge.

Server computing device 300 may be for example, a web server, a Local Area Network (LAN) server, a workstation, a desktop computer, or any other computing device suitable for execution of instructions 321-326. Server computing device 300 may include a processor 310, which may be one or more hardware devices (e.g., CPUs, microprocessors, etc.) suitable for retrieval and execution of instructions stored in machine-readable storage medium 320. Alternatively, processor 310 may be one or more integrated circuits (ICs) or other electronic circuits that perform the functionality of instructions 321-326, Server computing device 300 may also include a storage device 315, which may be any physical device suitable for storage of data. Storage device 315 may store a challenge generated for a particular client 330 in association with a session identifier, as illustrated in table 317. In addition, server computing device 300 may include a machine-readable storage medium 320, which may include instructions 321-326 for preventing CSRF attacks by verifying requests from client computing device 330.

As illustrated by block 1, request receiving instructions 321 may receive an initial request from a client computing device 330. As described in detail above in connection with receiving instructions 122 of FIG. 1, this request may be, for example, a request from a web browser or other application running on client computing device 330.

In response to receipt of the request from the client 330, challenge generating and transmitting instructions 322 may generate a challenge for transmission to the client along with the response to the client request. As described in detail above in connection with challenge generating instructions 124 of FIG. 1, this challenge may include a random nonce used to verify that subsequent requests are legitimate. As illustrated by block 2, after generation of the challenge including the random nonce, instructions 322 may transmit the challenge to client computing device 300 in an HTTP cookie (e.g., in a dedicated cookie including only the challenge).

Verifying instructions 323 may verify, based on examination of data included in an HTTP header of a subsequent request from the client computing device 330, that the request includes a proper response to the challenge transmitted in the HTTP cookie. Response reading and comparing instructions 324 may first read the response to the challenge from either a cookie in the HTTP header or another field in the HTTP header. Instructions 324 may then check for the presence of a nonce in the response and, when such a nonce is present, compare the value of the nonce to an expected value of the nonce.

Because challenge generating and transmitting instructions 322 transmit the challenge in an HTTP cookie, reading and comparing instructions 324 may expect the transformed nonce from client computing device 330 in a number of formats. For example, as illustrated by block 3A, instructions 324 may receive the nonce in an HTTP header field other than a cookie, which may be sufficient to confirm that client computing device 330 has authenticated the request. As another example, as illustrated by block 33, instructions 324 may confirm that client computing device 300 has authenticated the request based on receipt of a transformed nonce in the HTTP cookie in the HTTP header, provided that the received nonce has been properly transformed with a transformation function known to both the server 300 and client 330.

Request ignoring instructions 325 may ignore the request from client computing device 330 when the value of the nonce included with the request does not match the expected value of the nonce. Alternatively, when the nonce received with the request matches the expected value, server computing device 300 may prepare a response to the request from client 330. As illustrated by block 4, server computing device 300 may then transmit either an error message or the response to the request.

Cookie deleting instructions 326 may be included in embodiments in which the response from client 330 is included in an HTTP cookie. To protect against attacks that take advantage of cookie persistency, cookie deleting instructions 326 may delete the cookie received from client 330 from server 300. The deletion may include, for example, complete removal of the cookie from memory of server 300 such that it is no longer used in the communication or, alternatively, setting the value of the included nonce to an invalid value (e.g., a value that the nonce could never be based on proper use of the transformation function). In this manner, deleting instructions 326 may ensure that a malicious user may not successfully execute a malicious request subsequent to receipt of a proper response from client 330 in server 300.

Client computing device 330 may be, for example, a desktop computer, a laptop computer, a handheld computing device, a mobile phone, or the like. Client computing device 330 may include a processor 335, which may be one or more hardware devices (e.g., CPUs, microprocessors, etc.) suitable for retrieval and execution of instructions stored in machine-readable storage medium 340. Alternatively, processor 335 may be one or more integrated circuits (ICs) or other electronic circuits that perform the functionality of instructions 341-346. Machine-readable storage medium 340 may include instructions 341-346 for preventing CSRF attacks by authenticating requests sent to server computing device 300.

As shown in block 1, request transmitting instructions 341 may generate and transmit an HTTP request from client computing device 330 to server computing device 300. This request may be, for example, a request from a web browser or other application running on client computing device 330.

As shown in block 2, challenge receiving instructions 342 may receive a challenge included in an HTTP cookie from server computing device 300. This challenge may include a random nonce generated by the server 300 and may be included in any cookie transmitted in the HTTP header of the response to the client's first request.

Transformation operation performing instructions 343 may perform a transformation operation to modify a representation of the random nonce included in the challenge received from server 300. As detailed below, the transformation operation may include application of a transformation function to the nonce and/or a modification of the transport representation of the nonce. Instructions 343 may include nonce reading instructions 344, which may extract the nonce from the HTTP cookie included in the HTTP header of the response received from server 300.

In embodiments in which the nonce is to be included in an HTTP cookie of the next request, transformation operation performing instructions 343 may also include transformation function performing instructions 345. Instructions 345 may obtain the nonce from reading instructions 344 and, in response, apply a transformation function to the value of the nonce. The transformation function may be, for example, a mathematical function known to both the server 300 and client 330. It should be noted that, in embodiments in which the nonce is to be included in an HTTP header field other than a cookie, transformation function performing instructions 345 may also be executed in some implementations.

Finally, transformation operation performing instructions 343 may include HTTP header inserting instructions 346, which may insert the nonce into the HTTP header of the response to be transmitted to server 300. For example, HTTP header inserting instructions 346 may insert a modified or unmodified nonce into an HTTP header field other than a cookie. Alternatively, HTTP header inserting instructions 346 may insert the nonce transformed by instructions 345 into the HTTP cookie of the request. As shown in blocks 3A and 3B, request transmitting instructions 346 may then transmit the generated response to the challenge to server computing device 300.

Figure 3B:
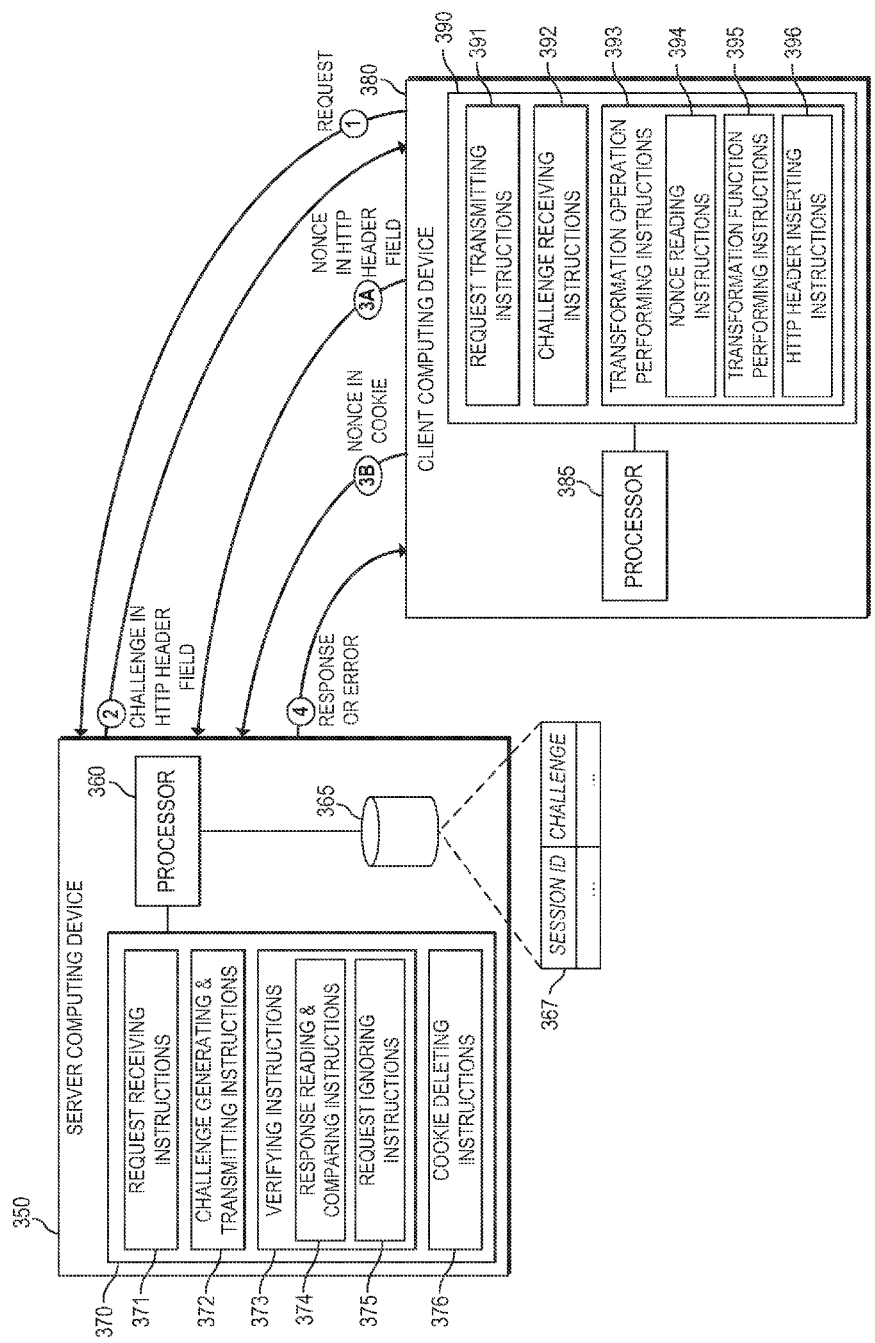
FIG. 3B is a block diagram of an example server computing device in communication with an example client computing device for verifying requests based on transmission of a challenge in an HTTP header field other than a cookie.

FIG. 3B is a block diagram of an example server computing device 350 in communication with an example client computing device 380 for verifying requests based on transmission of a challenge in an HTTP header field. As detailed below, server computing device 350 may prevent CSRF attacks by sending a challenge in an HTTP header field other than a cookie and authenticating requests from client computing device 380 based on a corresponding response to the challenge.

Server computing device 350 may be for example, a web server, a Local Area Network (LAN) server, a workstation, a desktop computer, or any other computing device suitable for execution of instructions 371-376. Server computing device 350 may include a processor 360, which may be one or more hardware devices (e.g., CPUs, microprocessors, etc.) suitable for retrieval and execution of instructions stored in machine-readable storage medium 370. Alternatively, processor 360 may be one or more integrated circuits (ICs) or other electronic circuits that perform the functionality of instructions 371-376.

Server computing device 350 may also include a storage device 365, which may be any physical device suitable for storage of data, Storage device 365 may store a challenge generated for a particular client 380 in association with a session identifier, as illustrated in table 367. In addition, server computing device 350 may include a machine-readable storage medium 370, which may include instructions 371-376 for preventing CSRF attacks by verifying requests from client computing device 380.

As illustrated by block 1, request receiving instructions 371 may receive an initial request from a client computing device 380. As described in detail above in connection with receiving instructions 122 of FIG. 1, this request may be, for example, a request from a web browser or other application running on client computing device 380.

In response to receipt of the request from the client 380, challenge generating and transmitting instructions 372 may generate a challenge for transmission to the client 380 along with the response to the client request. As described in detail above in connection with challenge generating instructions 124 of FIG. 1, this challenge may include a random nonce used to verify that subsequent requests are legitimate. As illustrated by block 2, after generation of the challenge including the random nonce, instructions 372 may transmit the challenge to client computing device 380 in an HTTP header field other than an HTTP cookie. For example, instructions 372 may include the challenge in a custom header field labeled with "extension-csrf-challenge" or with any other label, provided that client 380 is configured to extract the nonce from that field, Verifying instructions 373 may verify, based on examination of data included in an HTTP header of a subsequent request from the client computing device 380, that the request includes a proper response to the challenge transmitted in the HTTP header field. Response reading and comparing instructions 374 may first read the response to the challenge from either a cookie in the HTTP header or another field in the HTTP header. Instructions 374 may then check for the presence of a nonce in the response and, when such a nonce is present, compare the value of the nonce to an expected value of the nonce.

Because challenge generating and transmitting instructions 372 transmit the challenge in an HTTP header field other than a cookie, reading and comparing instructions 374 may expect the transformed nonce from client computing device 380 in a number of formats. For example, as illustrated by block 3A, instructions 374 may receive the nonce in an HTTP header field of a subsequent request, which may be sufficient to confirm that client computing device 380 has authenticated the request. This header field may be, for example, a header field with a different name than the field used to transmit the challenge. As another example, as illustrated by block 3B, instructions 374 may confirm that client computing device 380 has authenticated the request based on receipt of a nonce in the HTTP cookie in the HTTP header, In either example, instructions 374 may also apply a transformation function to the extracted nonce in determining the expected value of the nonce, provided that client computing device 380 is also configured to apply the transformation function.

Request ignoring instructions 375 may ignore the request from client computing device 380 when the value of the nonce included with the request does not match the expected value of the nonce. Alternatively, when the nonce received with the request matches the expected value, server computing device 350 may prepare a response to the previous request from client 380. As illustrated by block 4, server computing device 350 may then transmit either an error message or the response to the previous request.

Cookie deleting instructions 376 may be included in embodiments in which the response from client 380 is included in an HTTP cookie. To protect against attacks that take advantage of cookie persistency, cookie deleting instructions 376 may delete the cookie received from client 380 from server 350. The deletion may include, for example, complete removal of the cookie from memory of server 350, such that it is no longer used in the communication or, alternatively, setting the value of the included nonce to an invalid value (e.g., a value that the nonce could never be based on proper use of the transformation function). In this manner, deleting instructions 376 may ensure that a malicious user may not successfully execute a malicious request subsequent to receipt of a proper response from client 380 in server 350.

Client computing device 380 may be, for example, a desktop computer, a laptop computer, a handheld computing device, a mobile phone, or the like. Client computing device 380 may include a processor 385, which may be one or more hardware devices (e.g., CPUs, microprocessors, etc.) suitable for retrieval and execution of instructions stored in machine-readable storage medium 390. Alternatively, processor 385 may be one or more integrated circuits (ICs) or other electronic circuits that perform the functionality of instructions 391-396. Machine-readable storage medium 390 may include instructions 391-396 for preventing CSRF attacks by authenticating requests sent to server computing device 350.

As shown in block 1, request transmitting instructions 391 may generate and transmit an HTTP request from client computing device 380 to server computing device 350. This request may be, for example, a request from a web browser or other application running on client computing device 380.

As shown in block 2, challenge receiving instructions 392 may receive a challenge included in an HTTP header field from server computing device 350. This challenge may include a random nonce generated by the server 350 and may be placed in any predetermined header field included in the HTTP header of the response to the client's first request.

Transformation operation performing instructions 393 may perform a transformation operation to modify a representation of the random nonce included in the challenge received from server 350. As detailed below, the transformation operation may include modification of the transport representation of the nonce and, in some embodiments, application of a transformation function to the nonce. Instructions 393 may include nonce reading instructions 394, which may extract the nonce from a predetermined HTTP header field of the response received from server 350, It should be noted that HTTP header fields are typically not automatically transmitted with each request from a web browser or similar application. Accordingly, the inclusion of the nonce in the HTTP header of the response from the client computing device 380 is sufficient to authenticate the request. However, in some embodiments, transformation operation performing instructions 393 may also include transformation function performing instructions 395. Instructions 395 may obtain the nonce from reading instructions 394 and, in response, apply a transformation function to the value of the nonce. The transformation function may be, for example, a mathematical function known to both the server 350 and client 380.

Finally, transformation operation performing instructions 393 may include HTTP header inserting instructions 396, which may insert the nonce into the HTTP header of the response to be transmitted to server 350. For example, HTTP header inserting instructions 396 may insert the nonce into either the HTTP cookie or another HTTP header field of the response. As shown in blocks 3A and 3B, request transmitting instructions 396 may then transmit the generated response to the challenge to server computing device 350.

Figure 4A:
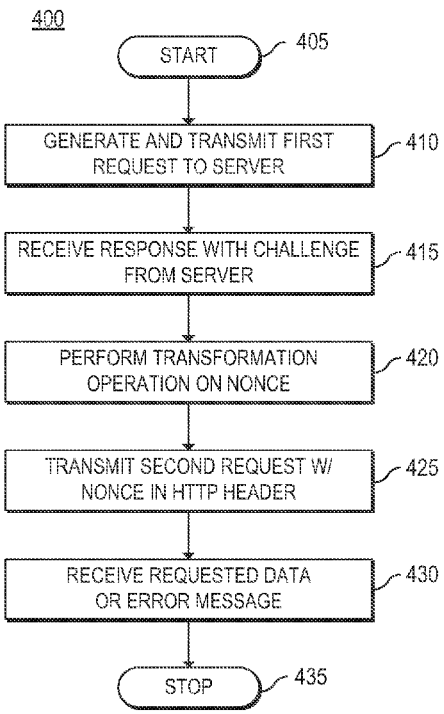
FIG. 4A is a block diagram of an example method performed by a client computing device for transmitting a request to a server computing device including a response to a challenge in an HTTP header.

FIG. 4A is a block diagram of an example method 400 performed by a client computing device 200 for transmitting a request to a server computing device 100 including a response to a challenge in an HTTP header. Although execution of method 400 is described below with reference to client computing device 200, other suitable components for execution of method 400 will be apparent to those of skill in the art (e.g., client computing devices 330, 380). Method 400 may be implemented in the form of executable instructions stored on a machine-readable storage medium. such as machine-readable storage medium 220 of FIG. 2.

Method 400 may start in block 405 and proceed to block 410, where client computing device 200 may generate and transmit a first request to server computing device 100. Method 400 may then proceed to block 415, where client computing device 200 may subsequently receive a response from server computing device 100 that includes a challenge. This challenge may include a random nonce generated by server computing device 100.

Upon receipt of an instruction to transmit a next request to server computing device 100, method 400 may then proceed to block 420. In block 420, client computing device 200 may perform a transformation operation on the nonce. This transformation operation may be used by client computing device 200 to prove to server computing device 100 that it has access to the value of the nonce, since typical browser security mechanisms prevent access to the nonce by a malicious user. The transformation operation may include application of a transformation function to the nonce and/or a modification of the transport representation of the nonce.

The particular transformation operation performed in block 420 may vary depending on the location in the HTTP header used for the challenge received in block 415. When server computing device 100 includes the challenge in an HTTP cookie in the HTTP header, client computing device 200 may apply the transformation function to the value of the nonce and include the nonce in the HTTP cookie of the next request. Alternatively, client computing device 200 may read the nonce from the cookie and place it in an HTTP header field other than a cookie in the next request. On the other hand, when server computing device 100 includes the challenge in an HTTP header field other than a cookie, client computing device 200 may include the value of the nonce in the HTTP cookie in the next request or, alternatively, in a different header field in the next request.

Regardless of the particular implementation, after application of the transformation operation, method 400 may proceed to block 425. It should be noted that, in some embodiments, method 400 may skip directly from block 415 to block 425. For example, when the challenge sent by server computing device 100 is included in an HTTP header field and the response from the client computing device 200 is also in an HTTP header field, client computing device 200 may include the nonce in the same header field of the response as the challenge.

Figure 4B:
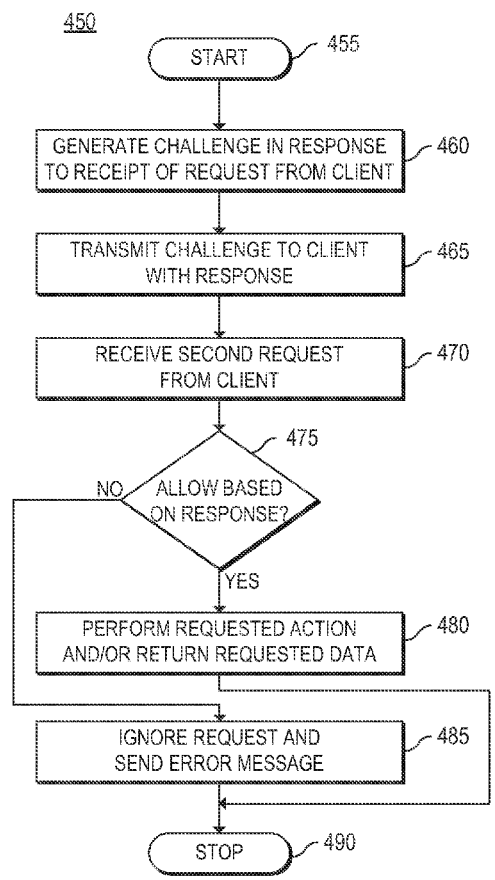
FIG. 4B is a block diagram of an example method performed by a server computing device for verifying a request from a client computing device using a response to a challenge included in an HTTP header.

In block 425, client computing device 200 may transmit the second request including the response to the challenge to server computing device 100. Method 400 may then proceed to block 430, where client computing device 200 may receive a response from the server 100. Finally, method 400 may proceed to block 435, where method 400 may stop, FIG. 4B is a block diagram of an example method 450 performed by a server computing device 100 for verifying a request from a client computing device 200 using a response to a challenge included in an HTTP header. Although execution of method 400 is described below with reference to server computing device 100, other suitable components for execution of method 400 will be apparent to those of skill in the art (e.g., server computing devices 300, 350). Method 400 may be implemented in the form of executable instructions stored on a machine-readable storage medium, such as machine-readable storage medium 120 of FIG. 1.

Method 450 may start in block 455 and proceed to block 460, where server computing device 100 may generate a challenge in response to receipt of a first request from a client computing device 200. This challenge may include a random nonce generated by the server computing device 100. Method 450 may then proceed to block 465, where server computing device 100 may transmit the challenge to the client along with the response to the first request.

Next, method 450 may proceed to block 470, where server computing device 100 may receive a second request from the client computing device 200. In order to prevent CSRF attacks, server computing device 100 may execute a number of steps to verify that the second request is a legitimate request from client computing device 100. Accordingly, method 450 may proceed to block 475, where server computing device 100 may determine whether to permit a response to the second request based on examination of data included in the HTTP header of the request.

In block 475, server computing device 100 may, for example, determine whether client computing device 200 has authenticated the second request based on examination of the request for a proper response to the challenge. Again, the process for determining whether the client 200 has properly authenticated the request may vary depending on the format of the challenge originally transmitted by server computing device in block 465.

For example, when server computing device 100 transmitted the challenge in an HTTP cookie of the response to the client's first request, server computing device 100 may check the HTTP cookie of the response for a nonce with a value correctly modified by a transformation function known to both the server 100 and the client 200. Alternatively or in addition, server computing device 100 may check for a nonce with either a modified or unmodified value of the nonce in an HTTP header field that is not a cookie. Alternatively, when server computing device 100 transmitted the challenge in an HTTP header field other than a cookie, server computing device 100 may check for a nonce with either a modified or unmodified value in either the HTTP cookie or an HTTP header field of the clients response to the challenge.

Regardless of the implementation, when server computing device 100 determines that the actual value of the nonce included with the response matches the expected value of the nonce, method 450 may proceed to block 480, where server computing device 100 may perform the requested action and/or return the requested data. Alternatively, when the actual value of the nonce does not match the expected value, method 450 may proceed to block 485, where server computing device 100 may ignore the request and send an error message. After either block 480 or block 485, method 450 may proceed to block 490, where method 450 may stop.

According to the foregoing, example embodiments disclosed herein allow for prevention of CSRF attacks based on a request authentication process using data included in an HTTP header. In this manner, a server may ensure that a request originating from a particular client is legitimate using a response to a challenge included in the HTTP header. Because this procedure may be performed using data in the HTTP header, example embodiments have a minimal impact on performance and minimize the number of changes in the application-level logic in each system.

I claim:

1. A server computing device comprising:
a processor to:
generate a challenge in response to receipt of a first request from a client, wherein the challenge includes a random nonce in a first Hypertext Transfer Protocol (HTTP) field of an HTTP header,
initiate transmission of the challenge to the client in response to the first request,
receive a second request from the client, and
verify, based on examination of data included in a second HTTP field of an HTTP header of the second request, that the second request includes a response to the challenge that is identical to the random nonce, wherein the second HTTP field is different from the first HTTP field.

2. The server computing device of claim 1, further comprising:
a storage device that stores the challenge for the client in association with a session identifier, wherein the session identifier is included in each communication between the client and the server computing device.

3. The server computing device of claim 1, wherein, to verify that the second request includes the response to the challenge that is identical to the random nonce, the processor:
reads the response from the second HTTP field in the HTTP header of the second request,
compares the response to an expected value of the response, and
ignores the second request when it is determined that the response does not match the expected value.

4. The server computing device of claim 3, wherein:
the second HTTP field in the HTTP header of the second request is an HTTP cookie, and
the processor initiates deletion of the HTTP cookie after the verifying that the second request includes the response to the challenge.

5. The server computing device of claim 1, wherein:
the processor generates a new random nonce upon receipt of each additional request from the client, and
the processor initiates transmission of the new random nonce with the challenge in response to the additional request.

6. The server computing device of claim 1, wherein:
the first HTTP field is an HTTP cookie, and the second HTTP field is not the HTTP cookie.

7. The server computing device of claim 1, wherein:
the first HTTP field is not an HTTP cookie, and the second HTTP field is the HTTP cookie.

8. The server computing device of claim 1, wherein:
the first HTTP field is not an HTTP cookie, and the second HTTP field is not the HTTP cookie and is a different field than the first HTTP field.

9. A non-transitory machine-readable storage medium encoded with instructions executable by a processor of a client computing device, the machine-readable storage medium comprising:
instructions for receiving, in response to a first request sent to a server, a challenge generated by the server, wherein the challenge includes a random nonce in a first Hypertext Transfer Protocol (HTTP) field of an HTTP header of a response from the server;

instructions for performing a transformation operation to modify a transport representation of the random nonce, the transformation operation comprising reading the random nonce from the first HTTP field of the response and inserting a value identical to the random nonce into a second HTTP field of an HTTP header of a next request, wherein the second HTTP field is different from the first HTTP field; and instructions for transmitting, to the server, the modified representation of the random nonce in the HTTP header of the next request.

10. The non-transitory machine-readable storage medium of claim 9, wherein the instructions for performing the transformation operation comprise:

instructions for reading the random nonce from an HTTP cookie transmitted in the HTTP header of the response from the server; and instructions for inserting the value identical to the random nonce into an HTTP header field of the next request, wherein the HTTP header field of the next request is not an HTTP cookie.

11. The non-transitory machine-readable storage medium of claim 9, wherein the instructions for performing the transformation operation comprise:

instructions for reading the random nonce from an HTTP header field of the response from the server, wherein the HTTP header field of the response is not an HTTP cookie; and instructions for inserting the value identical to the random nonce into an HTTP cookie in the HTTP header of the next request.

12. The non-transitory machine-readable storage medium of claim 9, wherein the instructions for performing the transformation operation comprise:

instructions for reading the random nonce from an HTTP header field of the response from the server, wherein the HTTP header field of the response is not an HTTP cookie; and instructions for inserting the value identical to the random nonce into an HTTP header field of the next request, wherein the HTTP header field of the next request is not an HTTP cookie and is a different header field than the HTTP header field of the response from the server.

13. A method comprising:

generating, in a server computing device, a challenge in response to receipt of a first request from a client, wherein the challenge includes a random nonce;

transmitting the challenge to the client in response to receipt of the first request, wherein the random nonce is included in a first Hypertext Transfer Protocol (HTTP) field of an HTTP header of a response to the first request;

receiving a second request from the client;

determining whether the client has authenticated the second request by determining whether the client has inserted a response to the challenge that is identical to the random nonce in a second HTTP field of an HTTP header of the second request, wherein the second HTTP field is different from the first HTTP field; and ignoring the second request when it is determined that the client has not authenticated the second request.

14. The method of claim 13, wherein:

the challenge is included in an HTTP header field other than a cookie of the response to the first request, and the determining whether the client has authenticated the second request comprises determining whether the HTTP header of the second request includes an HTTP header field or an HTTP cookie with a response to the challenge equal to the value of the random nonce.

15. The method of claim 13, wherein:

the challenge is included in an HTTP cookie in the HTTP header of the response to the first request, and the determining whether the client has authenticated the second request comprises determining whether the response to the challenge includes an HTTP header field other than a cookie including a value equal to the value of the random nonce.

* * * * *